Oct. 19, 1971  F. A. CINADR  3,613,483
SQUARE TURRET INDEXING MECHANISM
Filed April 13, 1970  4 Sheets-Sheet 1
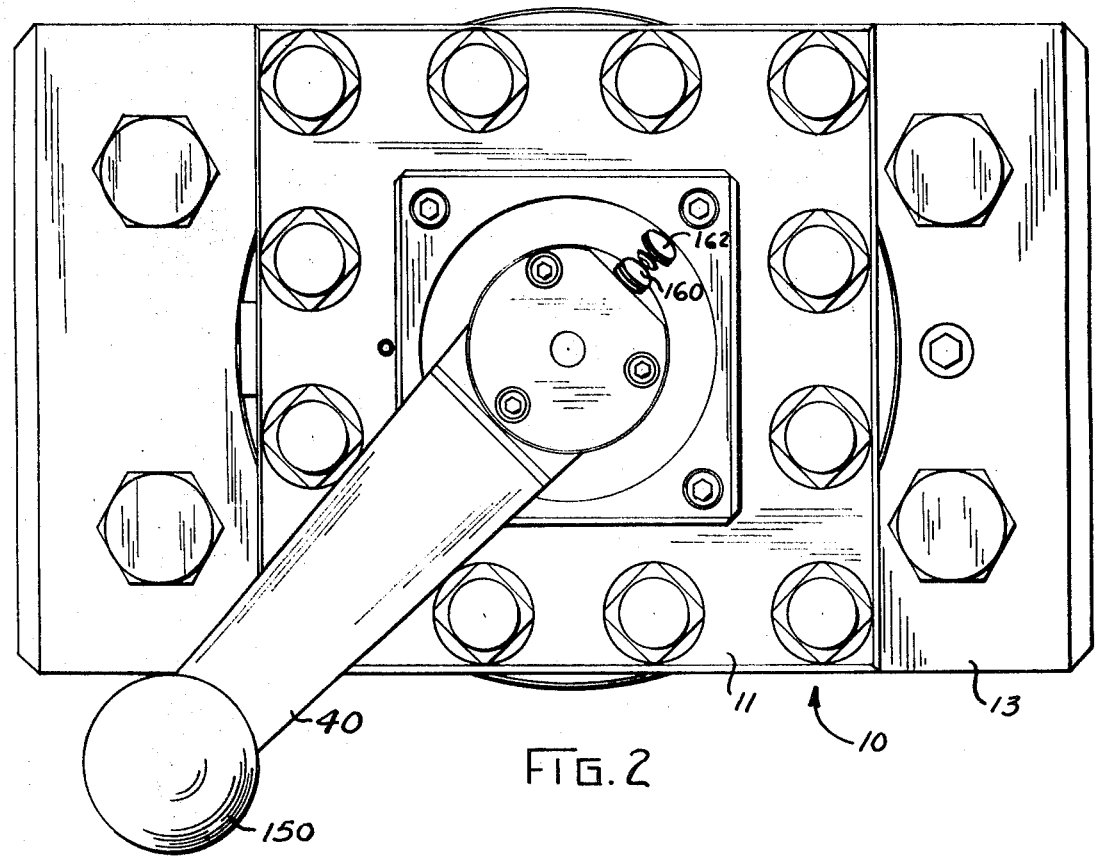
FIG. 2
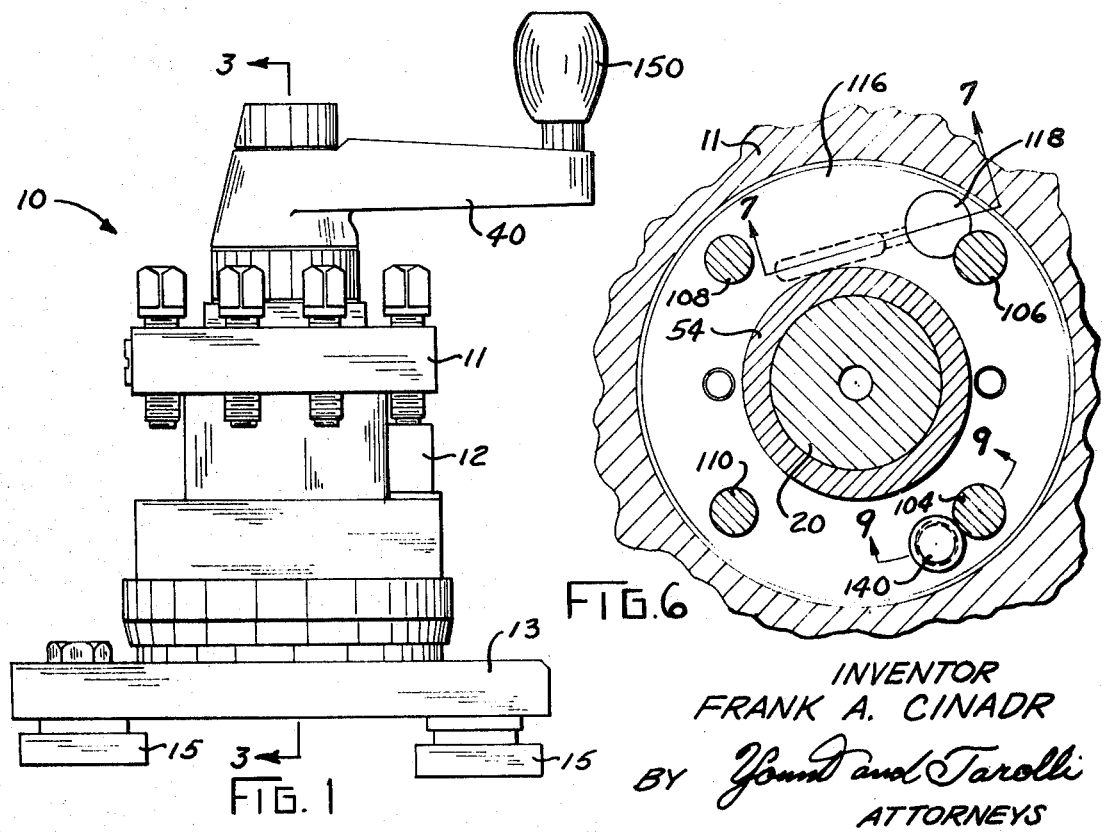
FIG. 1
FIG. 6
INVENTOR
FRANK A. CINADR
BY Young and Tarolli
ATTORNEYS INVENTOR
FRANK A. CINADR
BY Young and Tarolli
ATTORNEYS INVENTOR
FRANK A. CINADR
BY Yount and Tarolli
ATTORNEYS

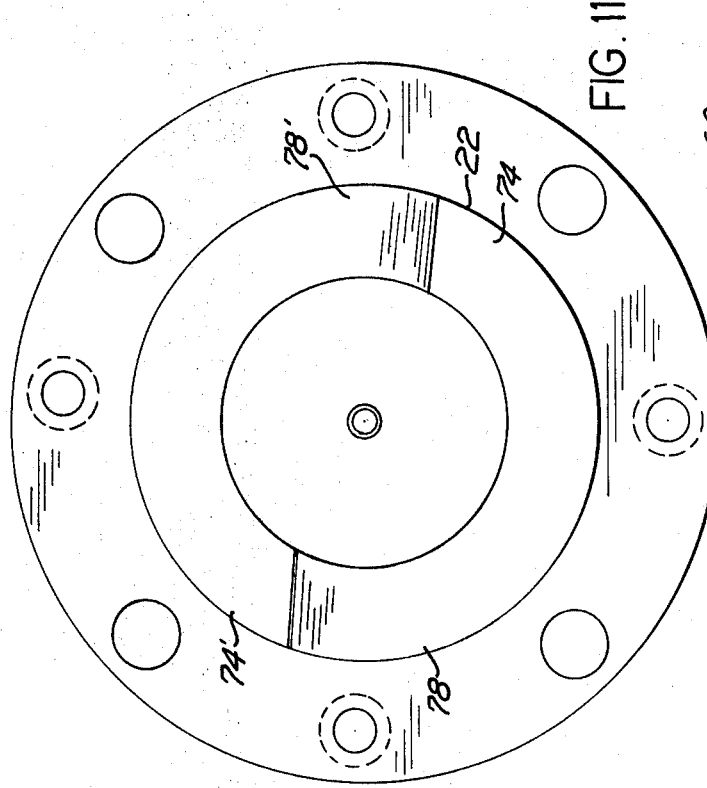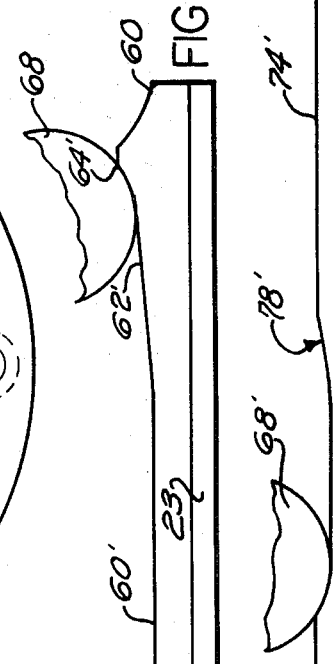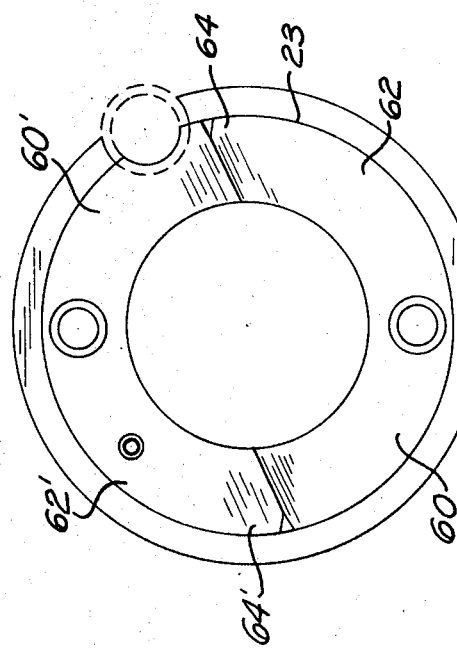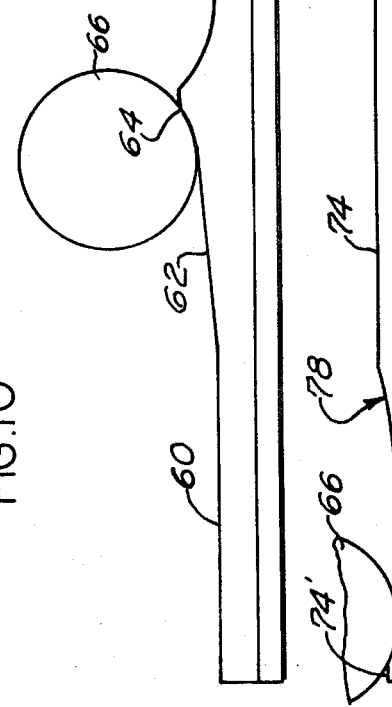

3,613,483
SQUARE TURRET INDEXING MECHANISM
Frank A. Cinadr, Cleveland, Ohio, assignor to The
Warner & Swasey Company, Cleveland, Ohio
Filed Apr. 13, 1970, Ser. No. 27,934
Int. Cl. B23b 29/32
U.S. Cl. 74—824          10 Claims

ABSTRACT OF THE DISCLOSURE

An improved turret indexing mechanism for selectively rotating an indexible turret to bring tools held thereby into an operative relation with a workpiece includes a Curvic coupling for locking the turret in a selected angular position. A central shaft member operatively associated with the turret and having a cam follower affixed thereto which is rotatable with the central shaft, and a cam track in which the cam follower rotates and which effects axial movement of the central shaft and the turret associated therewith upon movement of the cam follower through the cam track. Rotation of the central shaft in one direction raises the turret to disengage the teeth of the Curvic coupling and indexes the turret. Rotation of the central shaft in the opposite direction lowers the turret and engages the teeth of the Curvic coupling to thereby lock the turret in a selected position. The indexing mechanism also includes stop means which normally limit the rotation of the turret so that the turret may only be rotated to its next operative position. This construction enables the turret to be rapidly and efficiently unlocked, automatically indexed to a new position, and then locked in the new position with a sufficient force so that inadvertent rotation of the turret out of the new position will not occur due to vibration of the turret.

---

The present invention relates to machine tool turrets for use on lathes or the like and which are of the type having a rotatable turret member which can be moved into a number of positions and, more specifically, to an indexible turret and means associated therewith for rotating the turret to selectively bring each of a number of tools held thereby into an operative relation with respect to a workpiece.

Machine tool turrets having rotatable turret members which can be indexed into a number of positions are known. One example is disclosed in Diener Pat. 3,094,025. The raising of the turret in the Diener patent prior to indexing thereof is effected by a screw-and-nut construction. The present invention is directed to an indexble machine tool turret assembly which eliminates the need for such a screw-and-nut construction and which provides a simple cam arrangement for effecting raising of the turret prior to indexing thereof.

It is an object of the present invention to provide a new and improved indexible turret which may be mounted on a machine tool carriage or on the cross slide of a lathe or other machine tool and in which the rotatable turret member can be raised prior to indexing to a new position by a cam arrangement.

A more specific object of the present invention is to provide a new and improved indexible turret which is adapted to be held in a selected angular position with respect to a supporting base by a Curvic coupling means having meshing teeth, and which includes a central shaft, cam means which effect axial vertical movement of the central shaft and the turret upon rotation of the central shaft, and wherein the shaft member is operatively connected to the turret through a mechanism which includes a lost motion connection and a ratchet means whereby initial rotation of the shaft member in one direction will raise the turret and separate the Curvic coupling and continued rotation of the shaft member in the same direction will rotate the turret into a new position, while rotation of the shaft member in the opposite direction will lower the turret to engage the teeth of the Curvic coupling to thereby lock the turret in its new position.

A further object of the present invention is the provision of a new and improved indexible turret having a central shaft, automatic stop means including a plurality of abutment members carried by the turret for rotation therewith and held in contact with a base upon which the turret is mounted, cam means connected to the shaft for effecting vertical movement of the shaft and the turret upon rotation of the shaft so as to raise the turret and enable the turret to be indexed, and a stop member or pin carried by the base and movable into an elevated position in the path of the abutment members for engagement thereby to limit rotation of the turret.

Further objects and advantages of the present invention will be apparent from the following detailed description of a preferred embodiment thereof and from the accompanying drawings forming a part of this specification, and in which:

FIG. 1 is a side elevational view of an indexible machine tool turret embodying the present invention;

FIG. 2 is a top plan view of the indexible machine tool turret of FIG. 1 on an enlarged scale;

FIG. 6 is a sectional view of a portion of the turret, taken substantially along the line 6—6 of FIG. 3;

FIG. 10 is a plan view of the upper cam member;

FIG. 11 is a plan view of the lower cam member;

FIG. 12 is a layout of the upper cam surface illustrated in FIG. 10; and

FIG. 13 is a layout of the lower cam surface illustrated in FIG. 11.

Figure 3:
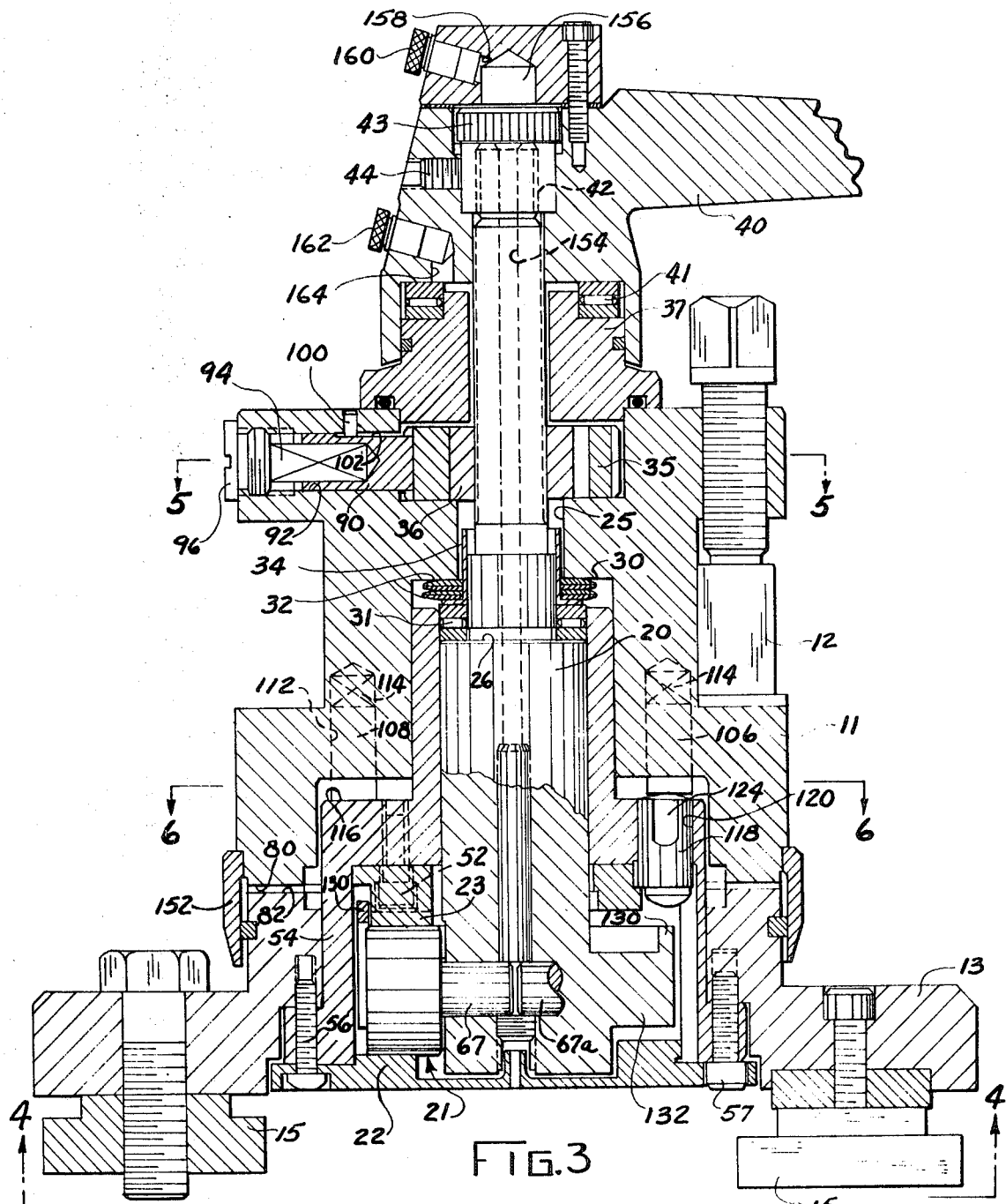
FIG. 3 is a sectional view of the turret of FIG. 1 taken approximately along line 3—3 of FIG. 1.

A four-position, or square, tool turret assembly 10, embodying the present invention, is illustrated in the drawings and comprises a turret or rotatable member 11 having a plurality of faces, each adapted to support a tool 12, as illustrated in FIG. 1. The tools 12, only one of which is illustrated in FIG. 1, are preferably four in number, corresponding to the four faces of the turret 11. The turret 11 is supported by a base 13 which is provided with means, such as T-shaped clamping members 15, by which the turret assembly 10 is adapted to be adjustably secured on a lathe cross slide, or the like.

The turret 11 is supported for rotation and for axial movement with respect to the base 13 by means of a central shaft 20, more fully illustrated in FIG. 3. To this end, the shaft 20 has a cam follower 21 affixed thereto. The cam follower 21 moves through a cam track defined between a pair of members 22 and 23 upon rotation of the shaft 20. Rotation of the cam follower 21 through the cam track effects axial movement of the shaft 20 and the turret 11 therewith.

A central opening 25 of the turret 11 is counterbored at both ends thereof, thereby providing an inwardly directed flange or shoulder portion 30. Thrust bearing means, such as needle bearings 31 and their associated races, are disposed between the shoulder portion 30 of the turret 11 and a shoulder 26 disposed on the shaft 20. The thrust bearing means 31 are retained in position by a flanged collar 34 which is disposed around the shaft 20. Located between the flange portion of the collar 34 and the shoulder portion 30 of the turret are Belleville washers 32.

Disposed above the shoulder 30 is a ratchet wheel 35 and a collar 36, which form parts of a ratchet and lost motion connecting means, later described in detail, a spacer 37, and an operating handle 40. Thrust bearing means 41 is disposed between the spacer 37 and the handle 40, and transmits forces therebetween. The handle 40 is connected to the shaft 20 by splines 42 and the handle is securely retained in engagement with the splines by a nut 43 threaded thereon and which is locked by a setscrew 44. It should, therefore, be apparent that rotation of the handle 40 will effect rotation of the shaft 20.

The cam follower 21 moves through the cam track defined between the upper cam member 23 and the lower cam member 22 upon rotation of the shaft 20. The upper cam 23 is secured to a support member 54 by a plurality of bolts, such as the bolt 52. The support member 54 is rigidly secured to the base 13 by a plurality of bolts 57 and a plurality of screws 56 secure the lower cam member 22 to the support 54 and the base 13. It should be understood that the cam members 22 and 23 include raised portions and dwell portions thereon which cooperate with the cam follower 21 to raise and lower the shaft 20 and the turret 11 upon rotation thereof.

Figure 4:
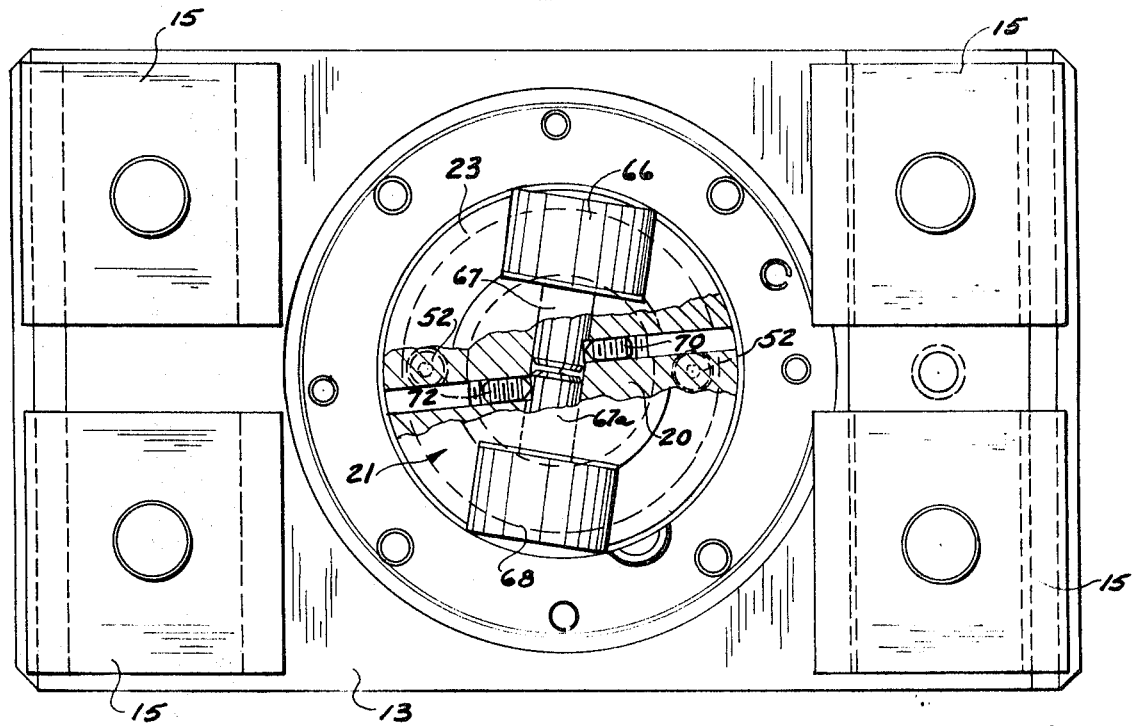
FIG. 4 is a bottom view of a portion of the turret with the lower cam track removed and taken approximately along the line 4—4 of FIG. 3.

The cam follower 21, as illustrated in FIG. 4, includes a pair of rollers 66 and 68 located on either end of the shafts 67, 67a. The shafts 67, 67a are rigidly affixed to the shaft 20 by the setscrews 70, 72, respectively, which are threadedly received in the shaft 20 and which engaged with suitable shoulders located on the shafts 67, 67a. The rollers 66, 68 engage with the cam members 22, 23 and the position of the rollers in the cam track determines the vertical relationship between the turret 11 and the base 13. Since each of the cam tracks is circular and the rollers 66, 68 are located in diametrically opposite portions of the cam track, it is necessary for each of the rollers to be engaged with similar portions of the cam tracks at all times. To this end, the upper cam track 23, as illustrated in FIGS. 10 and 12, includes the dwell portions 60, 60' which are located diametrically opposite each other, cam rise portions 62, 62' which are located diametrically opposite each other and the peak portions 64 64' which are also disposed diametrically opposite each other. Thus, it should be apparent that when the roller 66 engages with a dwell portion of the upper cam, the roller 68 will also engage with a dwell portion located diametrically opposite from the portion with which the roller 68 is engaged.

The lower cam member 22, illustrated in FIGS. 11 and 13, is constructed in a manner which is complementary to the upper cam member and includes the dwell portions 74 and 74' and the rise portions 78 and 78'. It should be obvious that when the roller 68 is engaged with the dwell portion 60 of the upper cam 23 and the dwell portion 74 of the lower cam 22, the roller 66 will be engaged with the dwell portion 60' of the upper cam 23 and the dwell portion 74' of the lower cam 22. The lower cam member 22 has a somewhat larger diameter than the upper cam member 23, and the developed views illustrated in FIGS. 12 and 13 are taken on different diameters.

The rollers will sequentially engage with different portions of the cam track as the rollers rotate therethrough. The peak portions 64 and 64' of the upper cam track tend to limit the rotational movement of the cam follower 21 and it should be apparent that after the cam follower has rotated approximately 135°, the peak 64, 64' of the cam 23 will cooperate to prevent further rotation of the roller in that particular direction.

It will be recognized that rotation of the handle or lever 40, and the shaft 20, therewith, in a counterclockwise direction, as viewed in FIG. 2, will result in a combined axial and rotational movement of the shaft 20 as the cam follower 21 thereof rises in the cam track due to the action of the cam members 22 and 23 thereon. It will also be recognized that the axial movement of the shaft 20 acting through the thrust bearing means 31 against the shoulder portion 30, will cause the turret 11 to rise or move axially away from the base 13. Clockwise rotation of the shaft 20 will cause the cam follower 21 to rotate to leave the dwell portions 60, 60', 74 and 74', and to engage the portions 78, 78', 62 and 62' so as to effect axial movement of the turret 11 under its own weight in a downwardly direction toward the base 13.

Curvic coupling means is provided between the turret 11 and the base 13 to lock the turret in each of the four mentioned positions, and comprises a set of teeth 80 disposed in a circular pattern extending from the turret 11, and a series of complementary teeth 82 disposed in a circular pattern and extending from the base 13. The teeth 80 and 82 are adapted to come into meshing engagement, as illustrated in FIG. 3, when the turret is moved toward the base 13, and to be separated or disengaged when the turret 11 is moved away from the base 13. When in engagement, the teeth 80 and 82 effectively prevent rotation of the turret 11, and it will be apparent that the turret can be clamped in such condition by rotation of the shaft 20 in a clockwise direction so that the cam follower 21 engages with the portions 78, 78', 62, 62' of the cam members to enable the turret 11 to move downwardly toward the base 13. Rotation of the turret 11 from one position to another can be effected only when the turret is in an unlocked condition, that is, when the Curvic coupling teeth 80 and 82 are not meshed.

Figure 5:
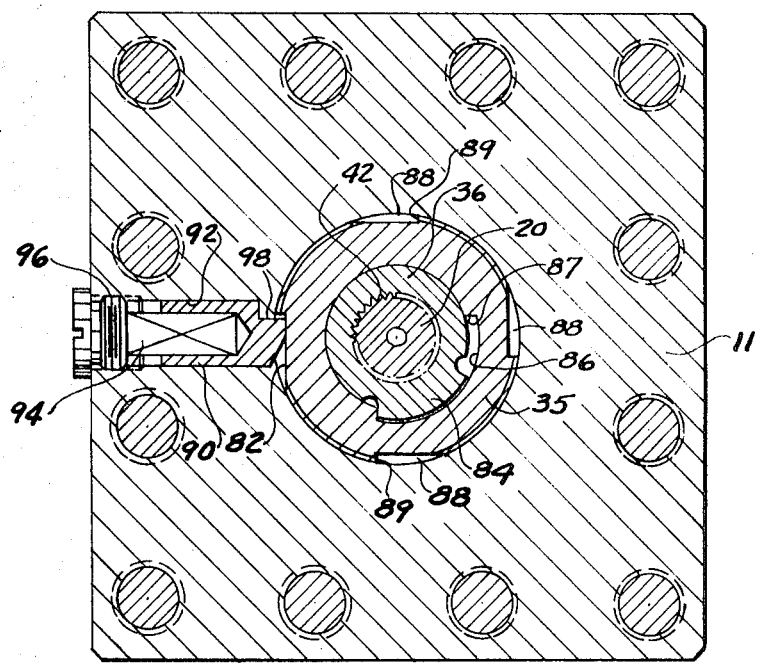
FIG. 5 is a sectional view of a portion of the turret, illustrating the lost motion connection and the ratchet means, taken substantially along the line 5—5 of FIG. 3.

The previously mentioned lost motion means and ratchet means are provided to drive the turret from the shaft 20 when the latter is rotated by movement of the operating handle 40. The collar 36 is connected for rotation with the shaft 20 and includes a key 84 which extends radially therefrom, as illustrated in FIG. 5. The key 84 is received in a slot 86 in a ratchet wheel 35, the latter being in surrounding relation to the collar 36. The key 84 and slot 86 provide a lost motion drive connection between the collar 36 and wheel 35 so that the shaft 20 and collar 36 are adapted to have limited rotation within the ratchet wheel 35 without effecting rotation of the turret 11.

The pitch of the cam members 22 and 23 is such that the limited rotation of the collar 36 relative to the ratchet wheel 35 is allowed by the lost motion means formed by the key 84 and the slot 86 will be sufficient to disengage the Curvic coupling teeth 80 and 82 by raising the turret 11 without rotating the turret. The pitch of the cam members is such that the rollers 66 and 68 must rotate and move upwardly from the base 13 when the turret is locked and, consequently, vibration and shock experienced by the turret assembly when the turret assembly is in use will not cause the rollers 66, 68 to rotate out of the locking portions of the cam track in which they are shown in dotted lines in FIGS. 11, 12, and thereby loosen the turret 11 from the base 13.

The ratchet wheel 35 has indentations 88, four in the illustrated embodiment, equally spaced about its periphery. The indentations are each defined in part by a radially extending shoulder 89. A plunger 90 is reciprocally mounted in a radially extending bore 92 disposed in the turret 11 and is resiliently biased or urged into engagement with the periphery of the ratchet wheel 35 by a compression spring 94 which is retained by a plug 96. The plunger 90 cooperates with the ratchet wheel 35 in the manner of a pawl and is provided with a flat surface 98 to provide for more complete engagement with the shoulders 89 of the indentations 88. A key 100 is rigidly held by the turret 11 and has one end thereof received in a slot 102 formed in the plunger 90. The key 100 thereby prevents rotation of the plunger 90 and maintains the plunger in proper relationship to the ratchet wheel 35 so that the surface 98 thereof is always presented toward the shoulder 89 of the ratchet wheel.

The lost motion means of the key 84 in the slot 86, together with the ratchet means of the wheel 35 and plunger 90, forms connecting means by which the shaft 20 and its operating handle 40 are capable of limited rotation with respect to the turret 11 in one direction, and are capable of unlimited or free rotation with respect to the turret in the opposite direction. Thus, when the handle 40 has been moved counterclockwise until the key 84 engages with the end portion 87 of the slot 86, further rotation will cause the ratchet wheel 35 to rotate and the shoulder 89 will bear against the plunger 90 to carry the turret into rotation with the ratchet wheel 35 and the shaft 20.

Normally, the turret 11 is rotated one position at a time in order to successively bring each of the four tools mounted thereon into an operative position for performing certain operations in a given sequence. Means are therefore provided to prevent the turret 11 from being inadvertently rotated more than one position. To this end, abutment elements 104, 106, 108 and 110 are located on the bottom portion of the turret 11, as more fully illustrated in FIGS. 6 and 9. The position of the abutment elements corresponds to the four operative positions of the turret. The abutments 104, 106, 108 and 110 are slidably received in axially extending bores 112 and are resiliently biased toward the support 54 secured to the base 13 by springs 114. The abutment elements 104, 106, 108 and 110 will continually bear against the surface portion 116 of the support 54 and will describe arcuate paths therealong as the turret 11 is rotated with respect to the base.

Figures 7, 8, 9:
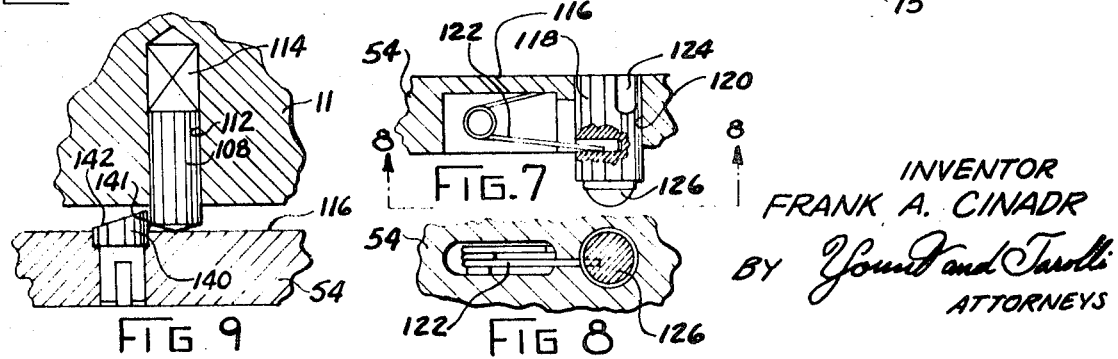
FIG. 7 is a sectional view, taken approximately along the line 7—7 of FIG. 6, and more fully illustrating the stop member.
FIG. 8 is a bottom view of the stop member, taken approximately along the line 8—8 of FIG. 7.
FIG. 9 is a sectional view of one of the abutment members, taken approximately along the line 9—9 of FIG. 6.

A single stop element or pin 118, as illustrated in FIGS. 7 and 8, is reciprocally mounted in a bore 120 disposed in the support 54 which is secured to the base 13. The stop 118 is suitably connected with a spring 122 which biases the pin 118 into the bore 120 so that the upper portion thereof is normally substantially flush with the surface 116 of the support 54. The stop 118 includes a depending end portion 126 which extends below the bore 120 into the cavity in which the cam follower 21 and cam members 22, 23 are located.

A stop pin actuating cam member 130 is disposed on a flange portion 132 located on the base of the shaft 20. The stop pin actuating cam member 130 has a generally arcuate configuration and rotates upon rotation of the shaft 20 and the cam follower 21. Rotation of the cam member 130 will enable the cam member 130 to engage with the depending end portion 126 of the stop pin 118 to thereby move the stop pin 118 upwardly through the bore 120 to dispose the stop pin 118 in the path of movement of an abutment element. A surface 124 is provided on the stop 118 so as to enable the stop to securely engage with one of the abutment elements when the stop pin is raised. The surface 124 reduces stresses in both the stop pin 118 and the abutment elements when they engage with each other due to the fact that surface contact exists between the stop pin 118 and the abutment element rather than line or point contact.

Upon rotation of the shaft 20 by movement of the handle 40 in a counterclockwise direction, as viewed in FIG. 2, the key 84 will travel in its slot 86 without imparting movement to the ratchet wheel 35 and the cam follower 21 will rotate in the cam track to cause the shaft 20 to rise, thereby lifting the turret 11 to separate the teeth 80 and 82 of the Curvic coupling means. When the key 84 engages the end 87 of the slot 86, further counterclockwise movement of the handle 40 will cause the key 84 to drive the wheel 35 and rotate the turret 11. As the shaft 20 continues to rotate, the stop pin actuating cam member 130 will move into engagement with the depending end portion 126 of the stop pin 118. This will cause the stop pin 118 to rise up the surface of the cam member 130 to assume an elevated position extending above the surface 116 of the support 54 and into the path of movement of the abutment element 104. It should be apparent from FIG. 6 that initial counterclockwise rotation of the turret 11 will move the abutment element 106 past the position of the stop 118 prior to movement of the stop 118 into the path of an abutment element. However, when the abutment element 106 has moved past the stop 118, the stop 118 will move upwardly under the influence of the stop pin actuating cam member 130 and will be positioned so as to engage with the abutment member 104 as it rotates with the turret 11. The elevated stop 118 is thereby positioned to prevent rotational movement of the turret 11 beyond the point of contact of the abutment element 104 with the stp pin 118. The point at which the surface 124 of the stop pin 118. The point at which the surface 124 of is the point at which the turret 11 has been indexed to its next position. This, the abutment elements and the stop pin 118 cooperate to prevent rotation of the turret 11 beyond the desired index position.

When the turret 11 has been rotated to its new index position, it can be locked therein by rotating the handle 40 and the shaft 20 in a clockwise direction, thereby causing the cam follower 21 to rotate in a clockwise direction and causing the turret 11 to move downwardly toward the base 13 until it is firmly clamped against the base and the teeth 80 and 82 have engaged. The shaft 20 is permitted by the lost motion connection and ratchet means, described heretofore, to rotate in a clockwise direction for clamping of the turret while leaving the turret in this newly indexed position. This is due to the fact that when the ratchet wheel 35 rotates in a clockwise direction, the plunger 90 will not engage with the shoulder 89 of the ratchet wheel and unlimited rotation of the shaft 20 and ratchet wheel 35 relative to the turret may be effected.

In order to insure proper alignment in meshing of the teeth 80 and 82, a locating element or stud 140 is provided on the surface 116 of the support 54, as illustrated in FIG. 9. The locating element is adapted to engage with one of the abutment elements 104, 106, 108 and 110 to prevent clockwise rotation of the turret 11 relative to the base 13. It should be apparent that when the turret 11 is rotated in a counterclockwise direction, the abutment elements 104, 106, 108 and 110 will ride up the cam surface 142 of the locating element 140 and pass thereby. This, of course, will compress the springs 114 which bias the abutment elements and will not interfere with rotation of the turret in a counterclockwise direction. However, rotation of the turret in a clockwise direction will cause one of the abutment elements to engage with the stop surface 141 of the locating element and rotation of the turret in a clockwise direction will be prevented.

The stop 118 is adapted to act on one of the abutment elements at substantially the same time as one of the abutment elements passes the locating stud 140. Thus, as soon as the stop member 118 engages with one of the abutment elements, in this case element 104, counterclockwise rotation of the turret 11 will be halted and upon clockwise rotation of the handle 40, one of the remaining abutment elements, in this case element 110, will engage with the locating stud 140 which will assume a position adjacent the abutment element when one of the elements engages with pin 118. Thus, the stop pin 118 will halt counterclockwise rotation of the turret 11 when the turret is indexed to its next position and the locating stud 140 will prevent clockwise rotation of the turret 11 out of its desired position when the handle 40 is rotated in a clockwise direction to engage the teeth 80 and 82 and lock the turret 11 in its desired position.

If, for some purpose, it is desired to advance the turret 11 two or more positions, this may be done by moving the handle 40 back and forth, thereby ratcheting the turret 11 ahead one step at a time. Moreover, when the turret is in an unlocked condition and the handle 40 has not been moved sufficiently to actuate the positive stop pin 118, the turret may be manually rotated counterclockwise to any desired position.

For convenience in operation, the handle 40 may be provided with a rotatable ball or knob 150 and to prevent chips and other foreign matter from fouling the Curvic coupling teeth 80 and 82, a depending annular skirt or shield 152 is advantageously secured to the lower portion of the turret 11. Moreover, the central shaft 20 includes a passageway 154 disposed therein. The passageway 154 connects the chamber in which the cam members and cam follower are located with a chamber 156 disposed in the upper portion of the handle 40. The chamber 156 has an inlet 158 therein which is closed by a plug member 160. The plub member 160 is removable and lubricating fluid may be directed through the inlet 158 into the chamber 156 and through the passageway 154 to lubricate the cam follower and the cam members in a well-known manner. Moreover, a plug member 162 is disposed in the side of the handle 40 and closes a passageway 164 through which lubricating fluid may be directed to effect lubrication of the thrust bearings, the ratchet wheel and the splines of the shaft 20.

From the foregoing detailed description of a machine tool turret embodying the present invention and from the accompanying drawings thereof, it will be apparent that there has been provided a new and improved mechanism for indexing and clamping a machine tool turret which is flexible in its use and operation and rotatable to a positive stop, or to positions beyond the positive stop without going through complete cycles of operating handle movements for the latter positions. It will also be apparent that the invention may be embodied in a relatively simple and inexpensive construction and will provide accurate and reliable positioning of the tools carried by the turret. Although the tool turret assembly illustrated in the drawings and described is adapted to support four tools, the invention is equally susceptible for use with turrets for supporting any other number of tools having a corresponding number of different indexing positions.

What I claim is:

1. An indexible machine tool turret assembly comprising a base, a turret rotatable relative to said base, coupling means having teeth disposed on said base and said turret and which when meshed prevent rotation of said turret relative to said base, means for effecting axial and rotational movement of said turret with respect to said base, said means including a manually actuatable handle for effecting axial and rotational movement of said turret with respect to said base, a central shaft rotatable in response to rotation of said handle, means acting between said central shaft and said turret for effecting axial movement of said turret upon axial movement of said central shaft, cam follower means connected with said central shaft for rotational movement therewith, cam means fixedly associated with said base and engageable with said cam follower means upon rotation of said cam follower means with said central shaft and which cooperates with said cam follower means to effect axial movement of said cam follower means and said turret so as to disengage said teeth of said coupling means to thereby enable said turret to be indexed, and connecting means for connecting said central shaft to said turret and transmitting rotation from said shaft to said turret after disengagement of said teeth of said coupling means.

2. An indexible machine tool turret assembly as defined in claim 1 wherein said cam means include a pair of cam members fixedly associated with said base and between which said cam follower means moves upon rotation thereof.

3. An indexible machine tool turret assembly as defined in claim 2 wherein said pair of cam members have a circular configuration and said cam follower means includes a camshaft means fixedly connected with said central shaft and a pair of rollers one of which is located on each end of said camshaft means so that said rollers are disposed on diametrically opposite portions of said pair of circular cam members.

4. An indexible machine tool turret assembly as defined in claim 1 wherein said connecting means includes ratchet means and lost motion means for permitting unlimited rotation of said central shaft by said handle with respect to said turret in one direction and limited rotation of said central shaft with respect to said turret in the opposite direction so that rotation of said central shaft in said opposite direction by said handle initially effects raising of said turret and separation of said teeth of said coupling means to enable said turret to be indexed to a new position upon continued rotation of said central shaft and said handle in the same direction, and rotation of said shaft by said handle in said one direction effects lowering of said turret to thereby engage the teeth of said coupling means to lock the turret in said new position.

5. An indexible machine tool turret assembly as defined in claim 4 further including abutment means located on said turret and rotatable therewith, stop means located on said base and engageable with said abutment means to stop rotation of said turret when said turret has been rotated to a new work position, and a locating element disposed on said base for preventing rotation of said turret in said one direction after said turret has been positioned in said new position by said abutment means engaging with said stop means.

6. An indexible machine tool turret assembly as defined in claim 5 wherein said stop means includes a stop pin which engages with said abutment means when said turret has been indexed to said new position to prevent rotation of said turret beyond said new position, and a stop pin actuating cam member which rotates with said turret, said stop pin actuating cam member engaging with said stop pin upon rotation of said turret to thereby move said stop pin from a first position in which it is inoperable to engage with said abutment means to a second position in which it is disposed in the path of movement of said abutment means.

7. An indexible machine tool turret assembly comprising a base, a turret rotatable relative to said base, coupling means having teeth disposed on said base and said turret and which when meshed prevent rotation of said turret relative to said base, a rotatable central shaft for effecting rotation and axial movement of said turret with respect to said base, means acting between said central shaft and said turret for effecting axial movement of said turret upon axial movement of said central shaft, a cam follower connected with said central shaft for rotational movement therewith, a pair of cam members fixedly associated with said base and between which said cam follower rotates upon rotation of said central shaft, said pair of cam members cooperating with said cam follower upon rotation thereof to effect axial movement of said cam follower and said turret so as to disengage said teeth of said coupling means to thereby enable said turret to be indexed, and connecting means for connecting said central shaft to said turret and transmitting rotation from said central shaft to said turret after disengagement of said teeth of said coupling means, said connecting means including ratchet means and lost motion means which permit unlimited rotation of said central shaft with respect to said turret in one direction and limited rotation of said central shaft with respect to said turret in the opposite direction.

8. An indexible machine tool turret assembly as defined in claim 7 wherein said pair of cam members have a circular configuration and said cam follower means includes a camshaft fixedly associated with said central shaft and a pair of rollers one of which is located on either end of said camshaft so that said rollers are disposed in diametrically opposite portions of said pair of circular cam members.

9. An indexible machine tool turret assembly as defined in claim 8 further including abutment means located on said turret and rotatable therewith, stop means located on said base and engageable with said abutment means to stop rotation of said turret when said turret has been rotated to a new work position, and a locating element disposed on said base for preventing rotation of said turret in said one direction after said turret has been positioned in said new position by said abutment means engaging with said stop means.

10. An indexible machine tool turret assembly as defined in claim 9 wherein said stop means includes a stop pin and a stop actuating cam member which rotates with said turret, said stop actuating cam member engaging with said stop pin upon rotation of said turret to thereby move said stop pin from a first position in which it is in operable to engage with said abutment means to a second position in which it is disposed in the path of movement of said abutment means and thereby engages with said abutment means when said turret has been indexed to said new position to prevent rotation of said turret out of said new position.

References Cited
UNITED STATES PATENTS

| | | | |
|---|---|---|---|
| 3,422,710 | 1/1969 | Kilmer | 74—813 X |
| 3,449,990 | 6/1969 | Harman | 74—826 X |

WILLIAM F. O'DEA, Primary Examiner

F. D. SHOEMAKER, Assistant Examiner

U.S. Cl. X.R.

74—813 L, 826; 82—36 A